United States Patent
Sneed

(10) Patent No.: US 7,045,194 B2
(45) Date of Patent: May 16, 2006

(54) PROTECTIVE FLOORING UNIT WITH FLAP

(75) Inventor: Brett A. Sneed, Overland Park, KS (US)

(73) Assignee: Better Life Technoloogy, L.L.C., Lenexa, KS (US)

( * ) Notice: Subject to any disclaimer, the term of this patent is extended or adjusted under 35 U.S.C. 154(b) by 280 days.

(21) Appl. No.: 10/068,914

(22) Filed: Feb. 7, 2002

(65) Prior Publication Data
US 2003/0148071 A1    Aug. 7, 2003

(51) Int. Cl.
B32B 3/00    (2006.01)
B32B 3/28    (2006.01)

(52) U.S. Cl. .................. 428/156; 428/167; 428/192

(58) Field of Classification Search ............. 5/417; 296/97.23; 428/156, 167, 192
See application file for complete search history.

(56) References Cited

U.S. PATENT DOCUMENTS

| | | | |
|---|---|---|---|
| 441,785 A | 12/1890 | White | |
| 729,923 A | 6/1903 | Ellis | |
| 1,409,125 A | 3/1922 | Stanwood | |
| 1,948,327 A | 2/1934 | Berwick | |
| 2,044,407 A * | 6/1936 | Smith | 428/121 |
| 2,057,873 A | 10/1936 | Atwood | |
| 2,512,310 A * | 6/1950 | Corson | 15/215 |
| 2,667,654 A | 2/1954 | Peterson | |
| D171,974 S | 4/1954 | Jackler | |
| D174,795 S | 5/1955 | Caldwell | |
| D179,858 S | 3/1957 | Moor | |
| 3,298,290 A | 1/1967 | Fresne | |
| 3,577,581 A | 5/1971 | Stata | |
| 3,640,459 A | 2/1972 | Preisler | |
| 3,711,362 A * | 1/1973 | Ballard | 156/219 |
| 3,746,607 A * | 7/1973 | Harmon et al. | 428/167 |
| 4,143,194 A * | 3/1979 | Wihksne | 428/81 |
| 4,287,693 A | 9/1981 | Collette | |
| 4,382,986 A * | 5/1983 | Reuben | 428/88 |
| 4,420,180 A | 12/1983 | Dupont et al. | |
| 4,565,725 A * | 1/1986 | Spamer et al. | 428/167 |
| 4,816,316 A * | 3/1989 | Robbins, III | 428/161 |
| D330,536 S | 10/1992 | Holloway et al. | |
| 5,190,799 A | 3/1993 | Ellingson, III | |
| 5,213,870 A * | 5/1993 | Yamamoto | 428/172 |
| D339,560 S | 9/1993 | Byrd | |
| D365,544 S | 12/1995 | Snyder et al. | |
| 5,587,218 A * | 12/1996 | Betz | 428/67 |
| 5,614,288 A * | 3/1997 | Bustos | 428/167 |
| 5,626,933 A | 5/1997 | Long | |
| 5,776,583 A | 7/1998 | Peyton | |
| 5,815,995 A | 10/1998 | Adam | |
| 6,001,456 A * | 12/1999 | Newland | 428/167 |

* cited by examiner

Primary Examiner—Donald J. Loney
(74) Attorney, Agent, or Firm—Stinson Morrison Hecker LLP

(57) ABSTRACT

A protective flooring unit having a flap along an outer edge of the unit to enable separate flooring units to be joined by placing an overlapping portion of a second flooring unit on top of the flap of a first unit. The overall thickness or height of the flap is less than the maximum thickness of the main body of the unit such that there is not a significant rise or bump in the overlapping region.

13 Claims, 3 Drawing Sheets

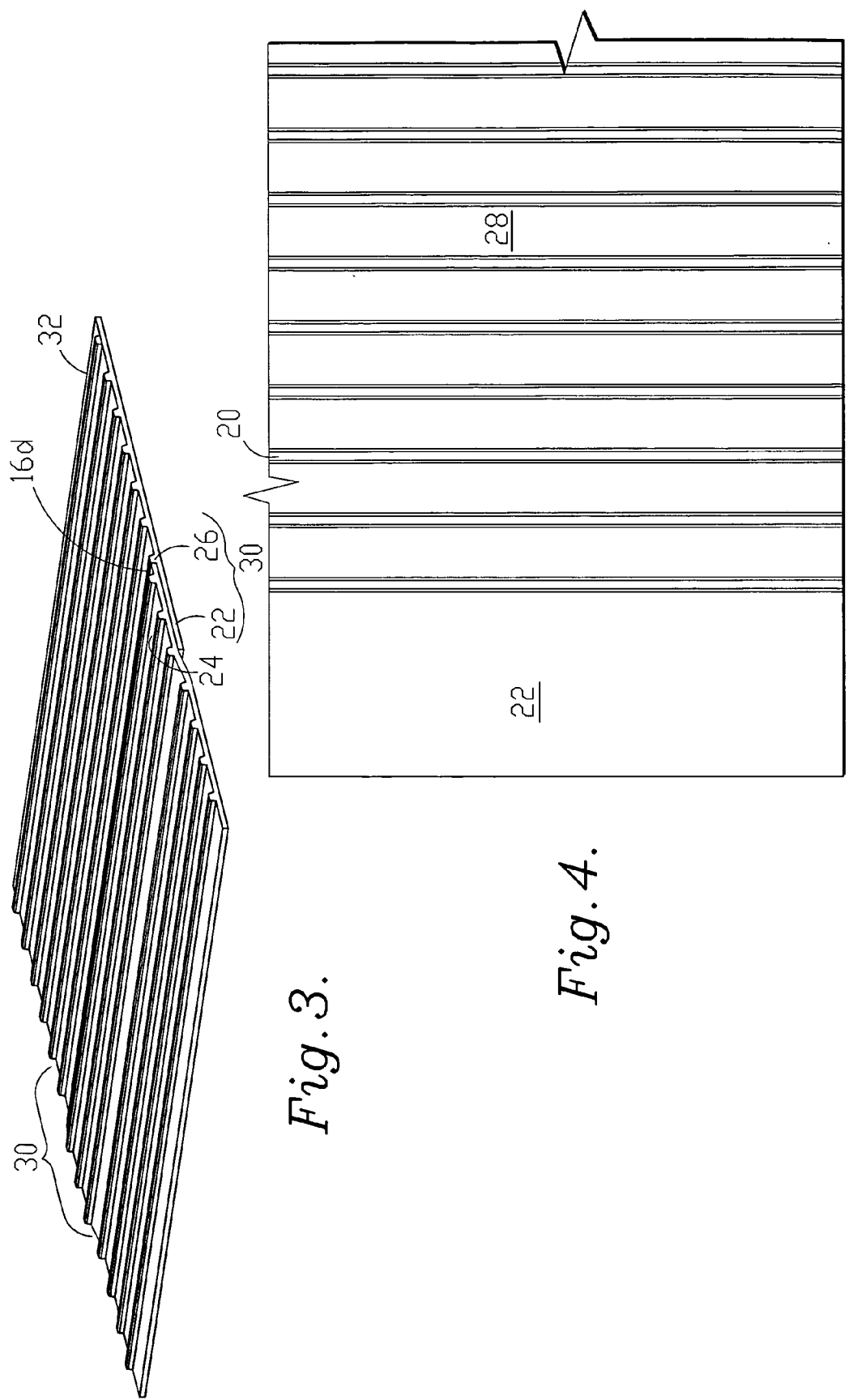

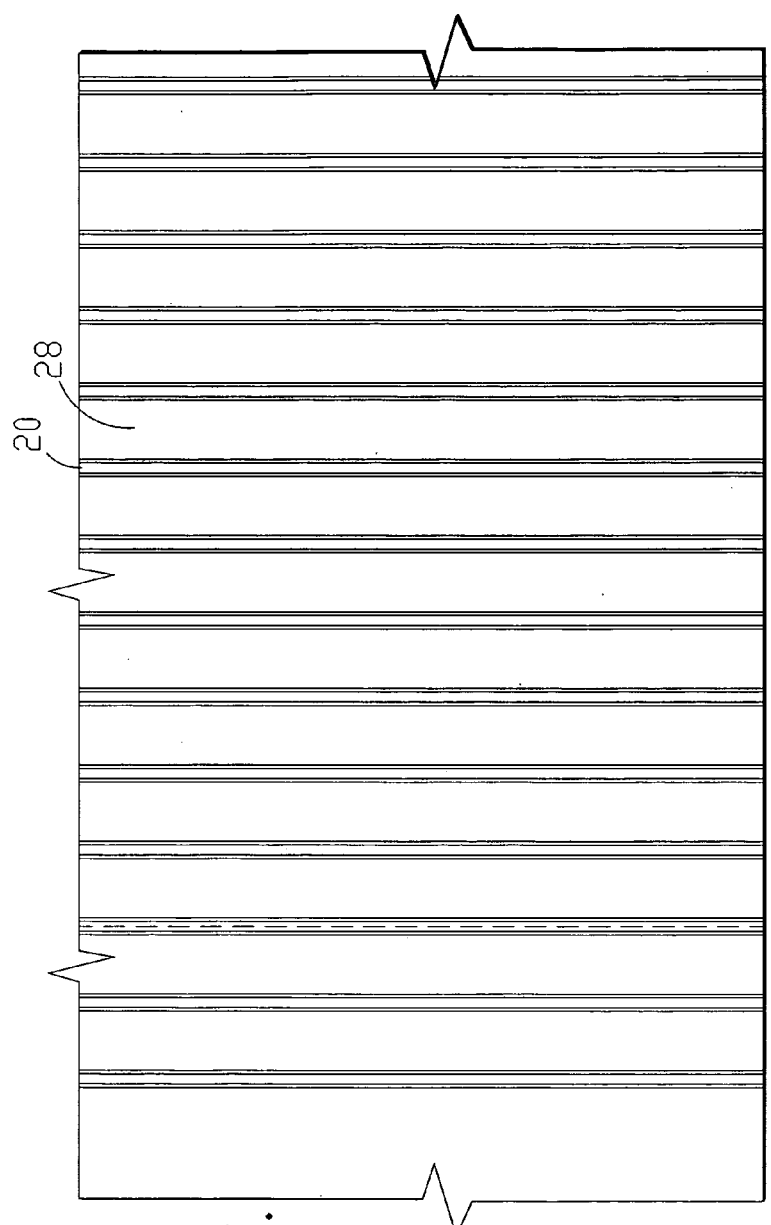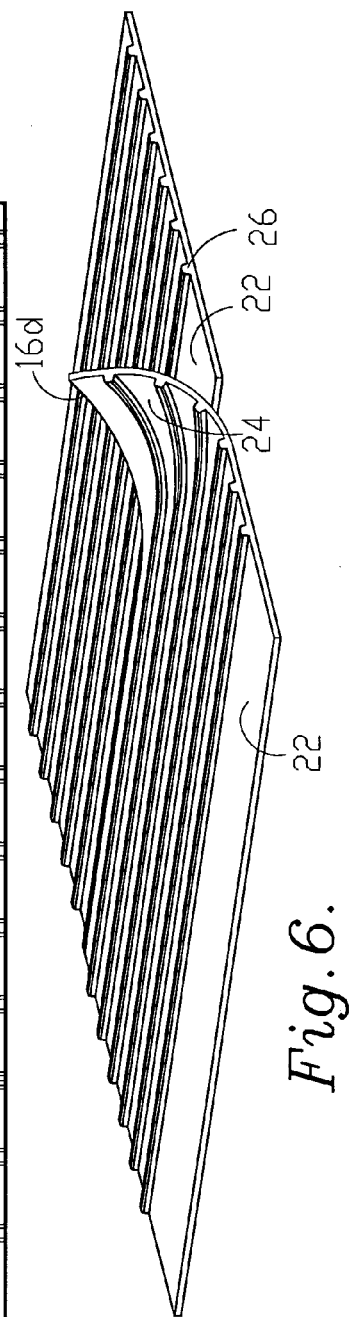

PROTECTIVE FLOORING UNIT WITH FLAP

CROSS-REFERENCE TO RELATED APPLICATIONS

This application claims benefit of U.S. Design patent application Ser. No. 29/117,377, filed on Jan. 21, 2000, which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention is generally directed to the field of flooring, and is more specifically directed to a protective flooring unit having a flap along its outer edge which enables a second flooring unit to be laid continuous with the first flooring unit so as to form a relatively uninterrupted protective floor covering that is easy to install, clean and remove if desired.

2. Description of Related Art

Garages, basements, utility rooms and other home and industrial work areas commonly have concrete or tile floors. While these floors can be washed or swept, it is often desirable to place a floor covering within the work area to capture spills and debris for easier clean-up and to prevent staining.

Thin plastic sheeting or tarps are commonly used for temporary floor protection. These tarps are generally resistant to stains and can be cleaned with water and detergents. Tarps are also fairly light weight so that they can be picked up and compactly folded for storage when not in use. Because they are relatively light weight and smooth, however, spilled liquid or debris tends to run off the sides onto the floor, particularly if the sheeting gets wrinkled or moved during use. In addition, it is often difficult to gather up a relatively large tarp and move it to another area for cleaning without having some of the spilled liquid or debris fall onto the floor.

Thicker flexible flooring units of plastic, vinyl, rubber and/or foam provide a durable covering that is less likely to wrinkle or move during use. These flooring units are typically sized to cover relatively small work areas. While these flooring units are useful in protecting such work areas, there is a need for durable floor coverings of this type to cover more sizable areas such as the entire floor of a garage. Yet, due to the methods employed for making these flooring units (e.g. extrusion or molding), it would be difficult and/or expensive to make and transport such large flooring units. In addition, the flooring units would likely be unwieldy to lift and handle for installation and/or removal without employing special equipment. Furthermore, there would likely be significant waste due to "cutting down" the mats to properly fit the area.

In an effort to provide a protective flooring for larger work areas, it is known to provide a series of strips of rubber or vinyl that can be laid adjacent one another to collectively cover the entire floor area. However, gaps between the edges of abutting strips expose the underlying floor such that debris and spills can seep onto the underlying floor. In an effort to overcome this problem, is has been suggested to bind the edges of adjoining strips together with separate plastic molding pieces. (See, U.S. Pat. No. 5,626,933). While the molding would cover the gap and prevent direct exposure of the underlying floor, spills could still seep under the molding and into the gap between the adjacent flooring units. Furthermore, the molding would likely interrupt the continuous, smooth appearance of the floor covering, and introduce safety problems by significantly raising the height of the floor covering at each seam. It is also anticipated that such a molding would significantly increase the cost of manufacture, would be time consuming to install and may crack or break over time and use.

Thus, while various protective floor coverings have been developed in the past, a need remains for a protective floor covering that can be readily manufactured, easily transported, installed and removed, if desired, for cleaning without the need for additional joining pieces or special equipment, while at the same time completely protecting the underlying flooring surface, and without introducing additional safety or aesthetic problems.

BRIEF SUMMARY OF THE INVENTION

The present invention is directed to a protective flooring unit having a flap along an outer edge of the unit. This flap enables separate flooring units to be joined by placing an overlapping portion of a second flooring unit on top of the flap of a first unit. Multiple flooring units may be joined to cover large areas by overlaying an overlapping portion of each subsequently placed flooring unit onto the flap of the previously placed flooring unit. Thus, multiple flooring units may be joined in an overlapping relationship at their edges, leaving no gap exposing the underlying flooring so as to better protect the floor against damage from debris and spills. The overall thickness or height of the flap is less than the maximum thickness of the main body of the unit such that there is not a significant rise or bump in the overlapping region.

In a preferred embodiment, the flooring unit is comprised of a sheet of material which may be manufactured to have varying thickness at different regions of the sheet. Preferably, the unit is comprised of a sheet of plastic, rubber, vinyl, foam or combinations thereof, and most preferably is made of vinyl. The unit comprises a main body having an overlapping portion along one edge of the main body, and a flap extending along an opposing edge of the main body. The main body has raised pads extending along the upper surface of the main body, preferably raised ribs running the length of the main body parallel the overlapping portion and the flap. Most preferably, the raised ribs are configured to confine spills to a small area of the unit by reducing the surface tension of the spilled material, thus allowing the spill to collect in channels between the ribs, and not bead-up to overflow into adjoining channels. The configuration of ribs also facilitates easy cleaning of debris and spills from the flooring unit by channeling hosed water off the unit in one direction during cleaning.

In this preferred embodiment, the flap does not include raised ribs and is instead relatively flat. In addition, the thickness or height of the flap is less than the maximum thickness or height of the main body, the maximum thickness of the main body being measured from the bottom surface of the unit to the top of a rib. Thus, when an overlapping portion of a second unit is placed on top of the flap, the thickness or height of the overlap region is not significantly greater than the maximum thickness of the main body, and is preferably no greater than twice the maximum thickness of the main body. In a most preferred embodiment, the combined thickness of the flap and the overlapping portion is about equal to the maximum thickness of the main body, leaving a substantially flat and virtually unnoticeable joint. The ribs are also preferably positioned on the overlapping portion such that when the overlapping portion is placed on top of an underlying flap, the pattern of ribs across both units is relatively continuous and uninterrupted.

The flooring unit of the present invention allows several smaller, easily manipulated flooring units to be arranged to cover large areas without requiring additional pieces, such as binding strips, while at the same time providing complete protection of the underlying floor. Overlapping adjacent flooring units allows an uninterrupted pattern of the raised ribs to contain spills and enable easier cleanup, and maintains the continuous, uniform appearance of the flooring unit. For more permanent installations, the overlapping portions of individual flooring units can be fastened with an adhesive or heat welding to the underlying flap.

BRIEF DESCRIPTION OF THE DRAWINGS

FIG. 3 is a perspective view of two flooring units in accordance with a preferred embodiment of the invention in an overlapped arrangement, with the overlapping portion of an uppermost flooring unit lying on top of the flap of an underlying flooring unit.

FIG. 4 is a fragmentary top view of the flooring unit of FIG. 2.

FIG. 5 is a fragmentary top view of two overlapped flooring units in accordance with a preferred embodiment of the invention.

FIG. 6 is a perspective view of the two overlapped flooring units of FIG. 3 with the uppermost flooring unit peeled back to reveal the flap of the underlying flooring unit.

DETAILED DESCRIPTION OF PREFERRED EMBODIMENT

Figure 2:
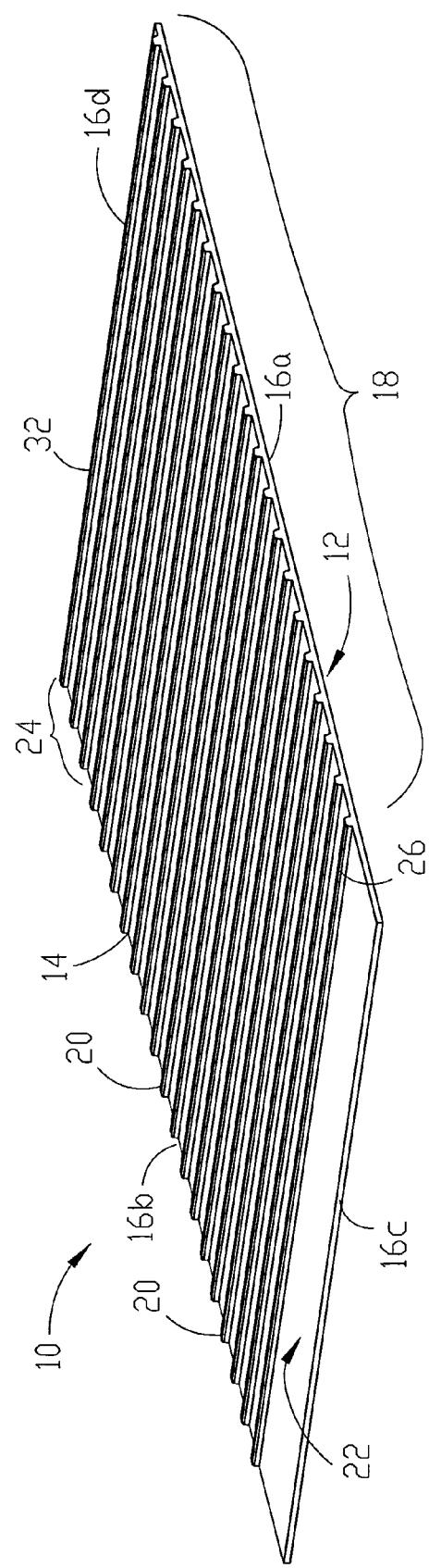
FIG. 2 is a perspective view of a single flooring unit in accordance with a preferred embodiment of the present invention.

As shown in FIG. 2, a protective flooring unit in accordance with a preferred embodiment of the invention is represented by the numeral 10. Unit 10 comprises a sheet of material having a bottom surface 12, a top surface 14 and four outer edges 16a, 16b, 16c and 16d. The main body 18 of unit 10 includes a plurality of raised ribs 20 extending parallel one another along the top surface of main body 18. A flap 22 extends outwardly from main body 18 adjacent and parallel outer edge 16c. An overlapping portion 24 of main body 18 extends adjacent and parallel outer edge 16d.

As shown in FIGS. 3 and 6, two or more units may be fitted together to form a floor covering by placing overlapping portion 24 of a second flooring unit on top of flap 22 of a first flooring unit, with outer edge 16d of the second unit abutted against outermost rib 26 of the first unit. Overlapping portion 24 has a width that is about the same width as flap 22 such that it will lie flush on top of flap 22. This overlapping arrangement leaves no gap that directly exposes the underlying floor, any gap between outer edge 16d of the second unit and the underlying first unit simply exposes flap 22 of the underlying unit.

Main body 18 acts as the main protective covering of unit 10, as debris and liquid will fall onto main body 18. Ribs 20 extend upwardly along the entirety of main body 18 to provide traction for a user. Channels 28 formed between adjacent ribs 20 serve to contain spills to small areas of unit 10 by confining the spill within channels 28. In the preferred embodiment shown in the drawings, ribs 20 are configured in a flat topped mound shape, wherein the sides of the ribs extend upwardly from the base sheet at an angle ranging from 60° to less than 90°, and preferably from 70° to 80° such that the relatively flat top of the rib is narrower than the base of the rib. In a most preferred embodiment, the maximum thickness of the main body 18 as measured from the bottom surface 12 to the top of the rib is about twice the minimum thickness of main body as measured from bottom surface 12 to the top surface of a channel. In addition, the width of the channels are preferable one (1) to four (4) times the width of the base of the ribs.

A key aspect of the invention requires that the overall thickness of flap 22 as measured from the bottom surface to the top surface of flap 22 is less than the maximum thickness of main body 18 as measured from the bottom surface of the main body to the top of a rib 20. In this manner, the combined thickness of the flap 22 and overlapping portion 24 at the overlap area 30 is less than twice the maximum thickness of main body. In this manner, a second flooring unit can be positioned on top of the flap without significantly increasing the height of the overlapped area 30. Preferably, the thickness of flap 22 is equal to or less than the minimum thickness of main body 18 as measured from the bottom surface of the main body to the top surface of channel 28. In addition, the maximum thickness of overlapping portion may be less than the maximum thickness of the remainder of the main body, to even further reduce or eliminate any increase in height at the overlap area 30. Most preferably, the combined thickness of overlapping portion 24 and flap 22 is about equal the maximum thickness of the main body 18, such that there is no increase in height at overlap area 30.

In the embodiment shown in the drawings, flap 22 is formed integral with main body 18, but does not include ribs 20 and is substantially flat. Thus, the overall thickness of flap 22 is about equal to the minimum thickness of main body 18 as measured from the bottom surface of main body to the top surface of a channel 28. While the flap shown in the drawings does not include ribs 20 and is relatively smooth and flat, it is anticipated that the upper surface of flap 22 may have texture to enhance the seal or to increase the friction between flap 22 and the overlapping portion 24 of an overlying flooring unit.

Furthermore, while the flooring unit of the embodiment shown in the figures has the flap 22 formed integral with main body 18, it should be understood that other configurations and compositions are envisioned by the present invention. For example, flap 22 may be formed of a separate piece of flooring material that is secured to main body 18 via adhesives, welding, or other means.

Figure 1:
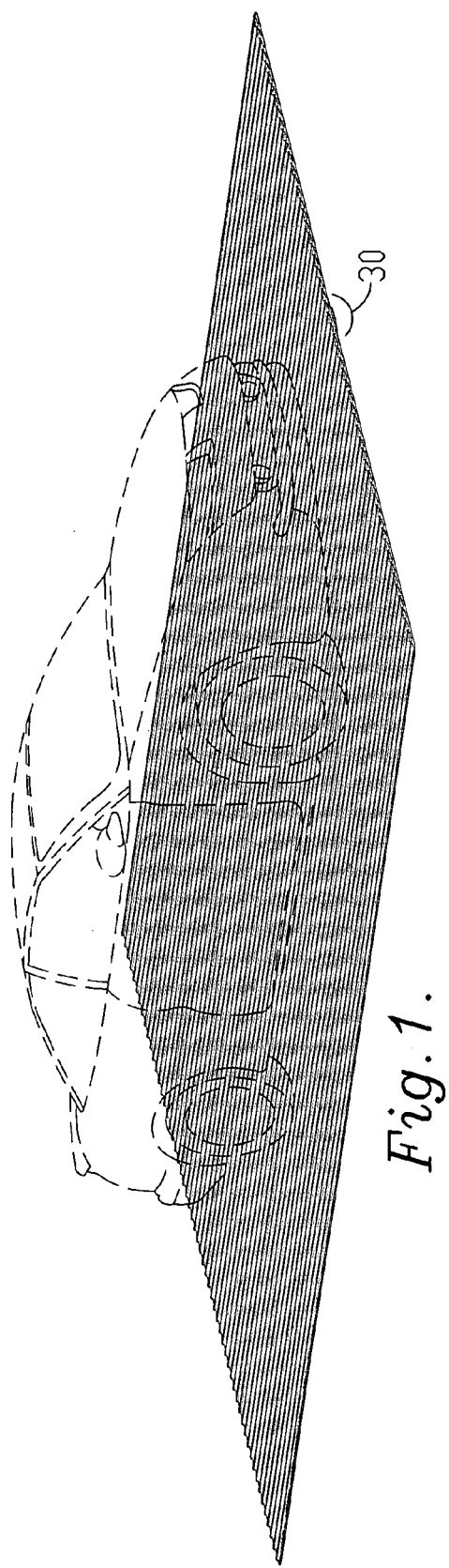
FIG. 1 is a perspective view showing an automobile parked on two overlapped flooring units in accordance with a preferred embodiment of the invention.

Looking to FIGS. 2 and 3, outermost rib 32 running along overlapping portion 24 is positioned inwardly of outer edge 16d a sufficient distance such that when outer edge 16d is abutted against outermost rib 26 of the underlying unit, the two ribs 26, 32 are positioned a uniform distance from one another consistent with the remaining ribs of the main body. This arrangement allows a continuous pattern of raised ribs, thus providing complete coverage and containment of spills. FIGS. 1 and 5 illustrate the continuity of the rib pattern with two flooring units overlapped at an overlap region 30.

In the most preferred embodiment, unit 10 is dimensioned for use in covering garage floors and other home or office utility areas. For this purpose, the width of unit 10 extending from outer edge 16c to outer edge 16d preferably ranges from about three (3) to twelve (15) feet wide, and the length preferably ranges from about ten (10) to forty (40) feet. Main body 18 has a maximum thickness preferably ranging from about 0.05 to 0.50 inches and a minimum thickness ranging from about 0.02 to 0.30 inches. Flap 22 has a thickness that is no greater than the maximum thickness of main body and preferably ranges from about 0.02 to less than 0.50 inches. The width of the flap from outer edge 16c to outermost rib 26 may vary and is preferably about two (2) to three (3) times as wide as the combined width of a rib and adjacent channel. Ribs 20 preferably have a base width ranging from about 0.05 to 0.50 inches and channels 28 have a width ranging from about 0.1 to 2.0 inches wide. In this manner, ribs 20 are spaced apart about 0.15 to 2.5 inches apart center-line to center-line.

By way of example, a preferred flooring unit 10 for use in covering garage floors has a width extending from outer edge 16c to outer edge 16d of about ten (10) feet and a length of about 30 feet. Main body 18 has a maximum thickness of about 0.12 inches and a minimum thickness of about 0.06 inches. Flap 22 similarly has a thickness of about 0.06 inches and the width of flap 22 from outer edge 16c to outermost rib 26 of about 5.75 inches. Ribs 20 have a base width of about 0.125 inches and channels formed between adjacent ribs are about 0.375 inches wide such that the ribs are spaced apart about 0.5 inches center-line to center-line. The sides of ribs 20 extend at a 75° angle with respect to the planar surface of the unit and has a flat top surface.

In a preferred embodiment, the protective flooring unit is manufactured from a durable, flexible flooring material, such as vinyl, rubber, rubber composites, foam or combinations thereof, and preferably vinyl. In the most preferred embodiment, the flooring unit is manufactured from polyvinyl chloride ("PVC") and may be combined with stabilizers or plasticizers. The units may be formed by any method known in the art for producing textured sheeting materials, and is preferably formed by extrusion, molding and/or embossing techniques, to enable the configuration and thickness of the unit to vary in different regions. This is necessary to provide the ribbed configuration of the main body and the smooth, optionally thinner configuration of the flap.

Most preferably, the unit is made of PVC through an extrusion process followed by embossing. It is believed that this method is particularly useful for producing relatively large flooring units. In this method, PVC flooring material compounds, in either pellet or powdered form, are poured from a hopper into a mixer or blending extrusion barrel, where the compounds are heated to a low melt point, typically in the range of 240 to 300 degrees Fahrenheit. The melted PVC compound is then forced out of the extruder and into a sheet die, forming a flat sheet of flooring material. The flat sheet is fed through embossing rolls which are patterned to emboss the raised ribs in the main body and to shape the relatively smooth flap. Next, the formed flooring unit is allowed to cool, and cutting shears trim the width and cut the flooring unit to the desired length. Finally, a rolling machine rolls the flooring unit for shipping.

Alternatively, the flooring unit may be formed by a casting process wherein the melted PVC compound is poured onto a long belt and a roller is rolled across the top of the flooring material to impress the raised ribs and flap onto the flooring material. The belt may also have a pattern which is formed into the bottom of the flooring unit.

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, is to be understood that all flooring units herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

What is claimed and desired to be secured by Letters Patent is as follows:

1. A protective flooring unit comprising:
    a main body having opposed first and second edges and opposed third and fourth edges, said main body comprising an overlapping portion extending adjacent and parallel said second edge, wherein a maximum thickness of said overlapping portion and of said third and fourth edges approximately equals a maximum thickness of said main body; and
    a single flap, wherein said flap is of uniform thickness and extends outwardly from said first edge of said main body, and wherein a thickness of said flap is less than a maximum thickness of said main body.

2. The protective flooring unit of claim 1, wherein said flooring unit is comprised of a sheet of material which may be manufactured to have varying thickness at different regions of the sheet.

3. The protective flooring unit of claim 2, wherein said flooring unit is comprised of a material selected from the group consisting of plastic, rubber, rubber composites, vinyl, foam and combinations thereof.

4. The protective flooring unit of claim 1, wherein said flap is formed integral with said main body.

5. The protective flooring unit of claim 1, wherein said main body has raised pads extending along an upper surface of the main body.

6. The protective flooring unit of claim 5, wherein said raised pads comprise ribs running a length of the flooring unit in a direction parallel the flap.

7. A protective flooring unit comprising:
    a main body having upwardly extending raised pads and opposed first and second edges and opposed third and fourth edges, said main body comprising an overlapping portion extending adjacent and parallel said second edge, wherein a maximum thickness of said overlapping portion and of said third and fourth edges approximately equals a maximum thickness of said main body; and
    a single flap, wherein said flap is of uniform thickness and extends outwardly from said first edge of said main body, and wherein said flap has a thickness that is less than a maximum thickness of said main body.

8. The protective flooring unit of claim 7, wherein said raised pads comprise ribs running a length of the unit in a direction parallel the flap.

9. The protective flooring unit of claim 7, wherein said flap has a thickness that is equal to or less than a minimum thickness of said main body.

10. The protective flooring unit of claim 7, wherein said overlapping portion has a maximum thickness that is less than a maximum thickness of a remainder of said main body.

11. The protective flooring unit of claim 10, wherein said overlapping portion has a width about equal to a width of said flap.

12. The protective flooring unit of claim 7, wherein a combined thickness of a maximum thickness of said overlapping portion and a thickness of said flap is no more than twice a maximum thickness of said main body.

13. The protective flooring unit of claim 7, wherein a combined thickness of a maximum thickness of said overlapping portion and a thickness of said flap is about equal a maximum thickness of said main body.

* * * * *